Oct. 31, 1961  G. V. BARDET ET AL  3,006,269
RICE PROCESSING MACHINE
Filed Jan. 12, 1959  3 Sheets-Sheet 1
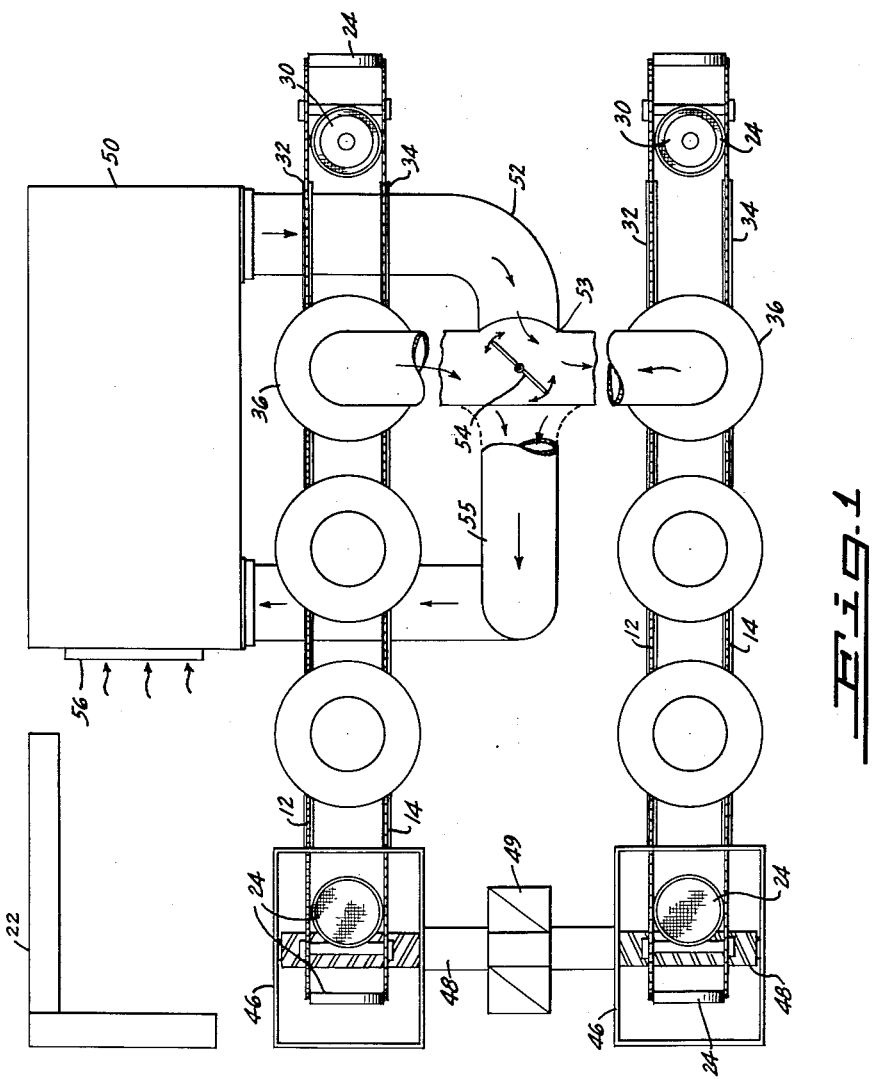
INVENTORS
George V. Bardet
Robert C. Giesse
ECKHOFF & SLICK
ATTORNEYS
BY
A member of the firm.

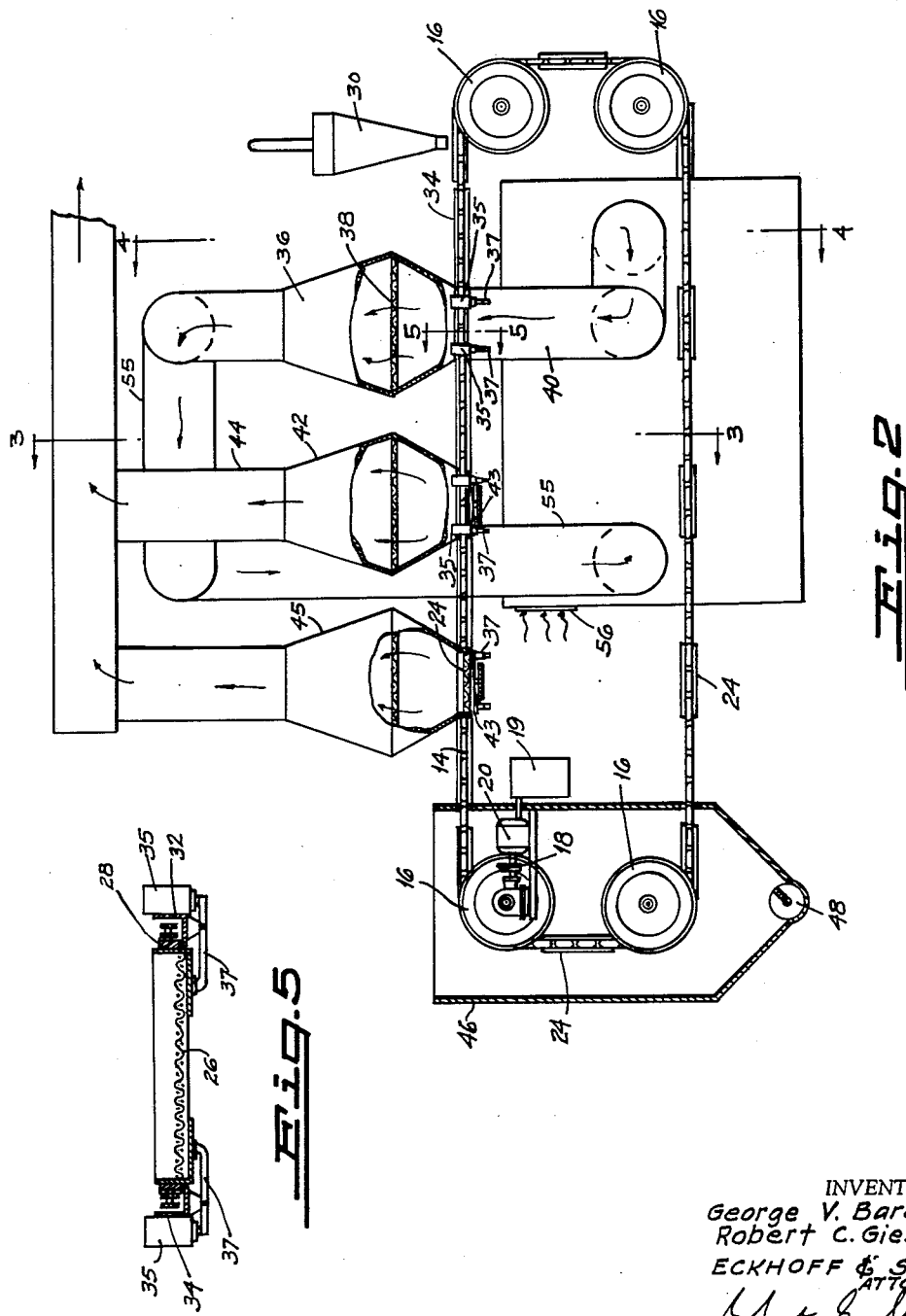

Oct. 31, 1961 G. V. BARDET ET AL 3,006,269
RICE PROCESSING MACHINE
Filed Jan. 12, 1959 3 Sheets-Sheet 3
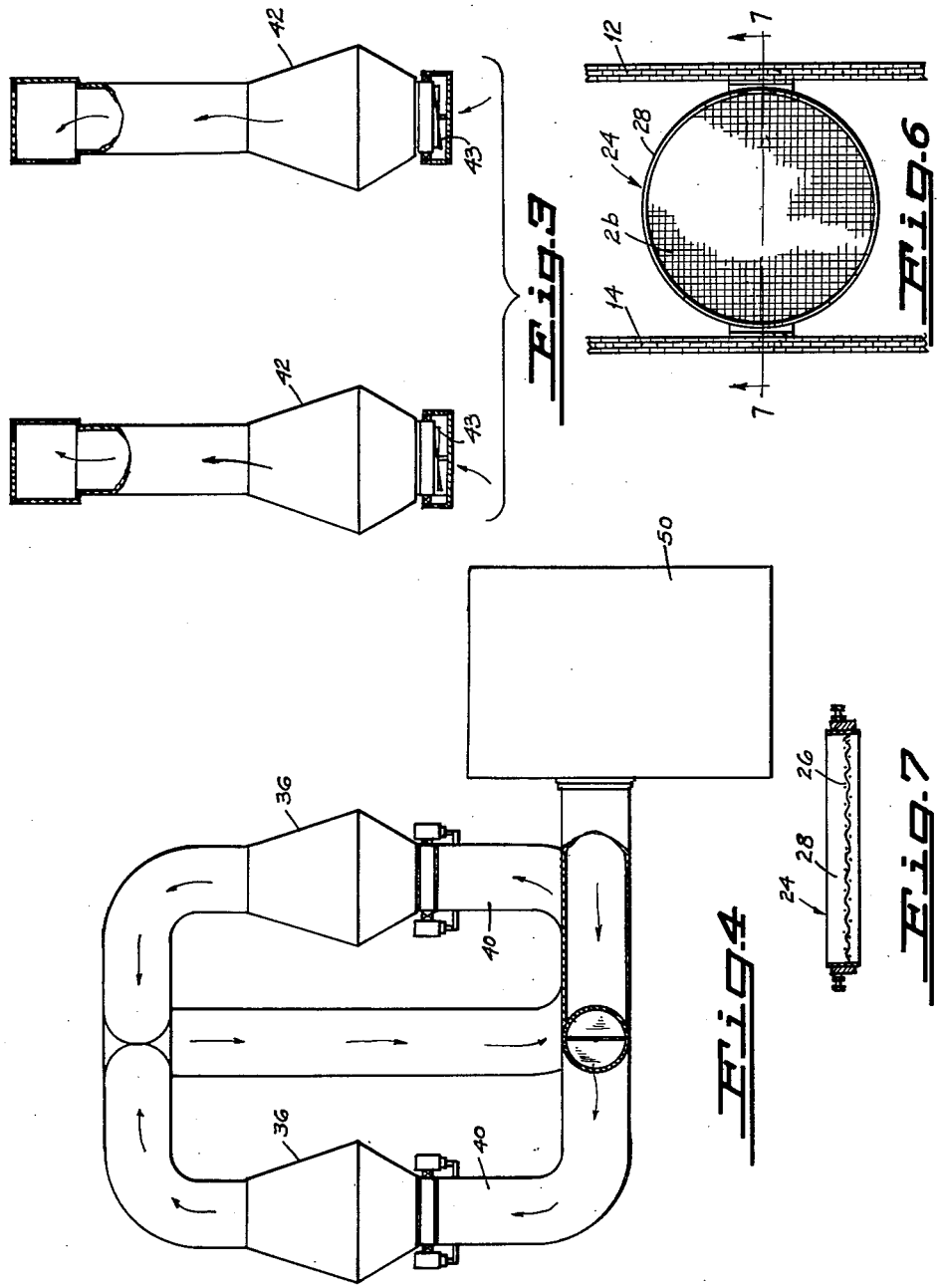
INVENTORS
George V. Bardet
Robert C. Giesse
ECKHOFF & SLICK
ATTORNEYS
BY
A member of the firm.

United States Patent Office 3,006,269
Patented Oct. 31, 1961

3,006,269
RICE PROCESSING MACHINE
George V. Bardet, Berkeley, Calif., and Robert C. Giesse, Bettendorf, Iowa, assignors to M.J.B. Co., a corporation of Delaware
Filed Jan. 12, 1959, Ser. No. 786,141
1 Claim. (Cl. 99—237)

This application is a continuation-in-part of our application, Serial No. 613,624, filed October 3, 1956.

This invention relates to a novel machine for processing brown rice.

Brown rice, which is paddy rice with the outer husk removed, but which has not been subjected to polishing, has been a well-known article of commerce for many years. However, in this country, brown rice has not enjoyed a widespread sale despite its nutritional superiority to the ordinary white or polished rice of commerce. One reason why such rice has not been more popular is that it is more difficult to cook properly than ordinary white rice since it normally requires a cooking time of about forty-five minutes and tends to become gummy. The long cooking time tends to reduce the vitamin B1 content, so that despite the high initial vitamin B1 content, a large portion of the vitamin B1 content of ordinary brown rice is lost on cooking. A further reason for its lack of popularity is that many people object to the taste and texture of brown rice.

It is the object of the present invention to provide a machine which produces a novel brown rice product which is very easy to cook and which has a superior flavor and texture to the ordinary brown rice of commerce. The rice may be cooked in about 15 minutes and does not become gummy, even if over-cooked. The flavor of the improved product of the present invention might well be described as toasted or nut-like. After processing, the rice may be vitamin enriched and the vitamin content will not be subsequently destroyed on cooking, since the cooking time is so short.

In general, the objects of the present invention are to provide a machine which subjects small batches of ordinary raw, brown rice to a very high temperature treatment for a very short period of time under conditions whereby the rice is in a constant state of agitation during the processing and whereby all of the grains are treated in exactly the same manner, followed by immediate and rapid cooling.

FIGURE 1 is a plan view of the machine of the present invention.

FIGURE 2 is a side elevation of the machine shown in FIGURE 1.

FIGURE 3 is a section on the lines 3—3 of FIGURE 2.

FIGURE 4 is a section on the lines 4—4 of FIGURE 2.

FIGURE 5 is an enlarged section on the lines 5—5 of FIGURE 2.

FIGURE 6 is an enlarged plan view of one of the trays and a part of the driving chains used in the present invention.

FIGURE 7 is a section on the lines 7—7 of FIGURE 6.

Turning now to a description of the drawings by reference characters, there is shown a machine having two pairs of endless chains designated 12 and 14, each of which chains passes over four sprockets 16 so that the chains pass through a generally rectangular course. Each pair of chains is driven by a prime mover 20, acting through a clutch and brake mechanism 18 for advancing the trays from one station to the next. A rectifier 19 supplies direct current to the clutch and brake. The chains move to the left in FIGURE 1, or counter-clockwise in FIGURE 2. Each pair of chains 14 and 12 carries a series of round, mesh-bottomed trays, generally designated 24, between them. The trays consist of a bottom 26 of mesh of a suitable size to retain grains of rice and an upstanding rim 28 of sufficient height to retain a quantity of rice thereon. The chains carrying the trays pass under a feed hopper 30 which may be a standard volumetric or gravimetric feeder. As a tray stops under the hopper 30, the latter discharges a measured quantity of rice onto the tray. The chains are again started and the filled tray passes between the guides 32 and 34 and under the first pair of processing chambers 36. As the tray comes to rest under the chamber 36, four pneumatic actuators 35, acting through the levers 37, press the tray into tight contact with the bottom of the chamber 36 so that no rice will be blown from between the two when a blast of air is applied, as is later described. In the upper portion of the chamber 36, a screen 38 is provided which may be of mesh similar to the screen 26, so that rice cannot be blown out of the chamber. When the tray is thus in place, hot air is blown upwardly through the rice from the ducts 40. The ducts 40 and the hot air source are described in greater detail hereinafter. The force of the air moving upwardly in the chamber 36 causes the rice to be suspended in a constant state of agitation during the treating step, although the force is insufficient to hold the rice against the top screen.

After the rice in the chamber has been subjected to the hot air for a sufficient length of time, the hot air supply is temporarily interrupted, allowing the rice to fall back onto the trays. The pneumatic lifters 35 are then released and the trays are then advanced one station, so that the tray whose path is being described is now under the chamber 42. The chamber 42 can be of exactly the same size and configuration as 36. Similar lifters are provided as illustrated. Under the chamber 42 is a freely rotating fan blade 43, which serves to distribute air through the tray and thus prevent channeling. The upper part of the chamber 42 is attached to the duct 44, which in turn leads to a valve, similar to 53 and to an exhaust fan, not shown. Air at ambient temperature is drawn upwardly through the rice, causing it to be cooled rapidly so that processing is rapidly brought to a halt. The air exhaust is cut off and the trays are again advanced one station so that the tray being described is directly under the chamber 45. The chamber 45 is exactly like chamber 42 and, here again, cold air is drawn through the rice to aid in further cooling. The tray then advances and eventually comes into the hopper 46, where it is dumped, as shown. The rice can then be conveyed to the desired point by means of the screw conveyor 48, which leads to a common conveyor for the two sides of the machine 49.

In the above description, it will be understood, of course, that the feed hopper 30, processing chamber 36, and the cooling chambers 42 and 45, are all spaced equal distances from each other and that this distance is equal to the distance between each two adjacent trays carried on the chains 12 and 14. The controls on panel 22, cause the clutch and brake of motor 20 to be actuated at the proper time and also control the actuation of the filter 30, the lifters and the vanes in the hot and cold air ducts.

It will be noted that in the machine thus far described, there are essentially two similar machines side by side and it is preferred to build the machine in this way in order that the most economical use be made of hot and cold air. In other words, the two lines of trays are not moved at the same time, but as one line is being processed, the other is moved and vice versa so that hot and cold air is kept flowing at a constant rate at all times. Of course, the machine could be designed as a single line machine, but this would be less economical of air since it would be necessary to either vent the blowers part of the time or shut the flow on and off.

The hot air is supplied to the machine by means of the heater-blower combination 50. Hot air is blown out through the duct 52 and into the two-way valve 53, which is provided with a vane 54. Thus, the vane 54 can be turned either of two positions so that air can be blown through either processing line. As the hot air leaves the processing chambers, it is taken through the line 55 back to the furnace for reheating and recirculation. Fresh make-up air is taken through the grille 56; the device can be operated with any desired portion of recirculated air. Normally, the device is operated with 25% to 35% of air which has been added each cycle to prevent accumulation of excessive amounts of moisture in the air.

In operating the device, raw brown rice is used having a moisture content of from 8% to 14% or, more normally, from 10% to 12%. Air is blown through the rice at a temperature of from 450° to 600° F., or preferably about 520° F., at a high enough velocity to hold the rice off of the screen 26 but insufficient to hold the rice against the upper screen 38. Ordinarily, an air velocity of about 2,500 feet per minute will be found suitable. When operating at a temperature of 520° F., it is normally found that the processing time will be about 17½ seconds, although various lots of rice may vary slightly and the process is not ordinarily regulated by the time of processing, but is ordinarily regulated by the appearance of the rice, correlated with actual cooking tests. It is important that the rice be cooled quickly to prevent over-processing. The finished rice has a toasted, puffed appearance wherein the bran layer is fractured in a number of places, exposing a portion of the starch of the rice. When the rice achieves this appearance, the processing is complete. The bulk density of normal brown rice is about .85, while that of the processed rice is .65.

The rice produced in accordance with the present invention is very easy to cook. One volume of rice may be placed with about one and one-half volumes of hot water and the mixture simmered for about fifteen minutes in a covered vessel. At the end of this time, the individual rice grains will be thoroughly cooked, but will not be the least bit gummy and the individual grains stand out and may be readily separated from each other. All of the water is taken up in the cooking process, so there is no water to drain off. Consumer panel tests conducted by an independent research organization, show that the rice made in accordance with the present invention is much more palatable to the average consumer than normal brown rice. In fact, many people who do not ordinarily like brown rice, express a liking for this product.

We claim:

In a machine for processing brown rice, a processing line comprising a pair of endless chains, a plurality of trays having perforated bottoms suspended between said chains and carried thereby, said trays passing through a series of work stations evenly spaced along the path of travel of said chains, means for driving said chains simultaneously whereby the chains advance a tray from one work station to the next, a loading station located on said path of travel wherein a measured quantity of rice is placed on each tray as it stops thereunnder, a heating station adjacent to said loading station, said heating station having means for blowing hot air upwardly through the rice at the heating station and having a chamber located over the means for blowing hot air, whereby rice will be blown from a tray and suspended within the chamber while hot air is blown through the tray and will drop back into the tray upon discontinuation of blowing air therethrough, a cooling station adjacent to said heating station whereby cold air is drawn through said rice and a discharge station whereby rice is discharged from each successive tray as it passes by said station.

References Cited in the file of this patent

UNITED STATES PATENTS

| | | |
|---|---|---|
| 446,759 | Little | Feb. 17, 1891 |
| 722,693 | Goings | Mar. 17, 1903 |
| 1,097,882 | Saunders et al. | May 26, 1914 |
| 1,106,271 | Ayres | Aug. 4, 1914 |
| 1,525,259 | Albers | Feb. 3, 1925 |
| 2,014,325 | Grilli | Sept. 10, 1935 |
| 2,219,329 | Engels | Oct. 29, 1940 |
| 2,374,587 | Weerth | Apr. 24, 1945 |
| 2,523,552 | Birdseye | Sept. 26, 1950 |
| 2,529,395 | Hummel | Nov. 7, 1950 |
| 2,805,639 | Martin | Sept. 20, 1957 |